Nov. 11, 1952                E. M. KALTENBACH                2,617,318
                                   SAW SET
Filed Nov. 19, 1951                                      2 SHEETS—SHEET 1
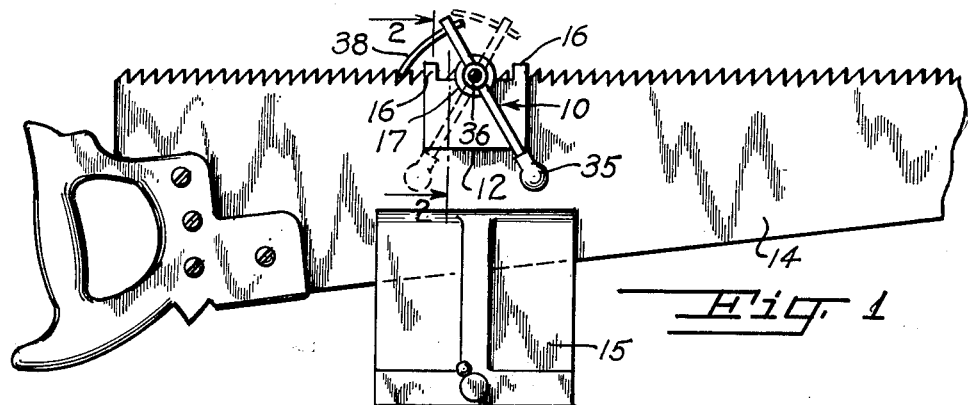
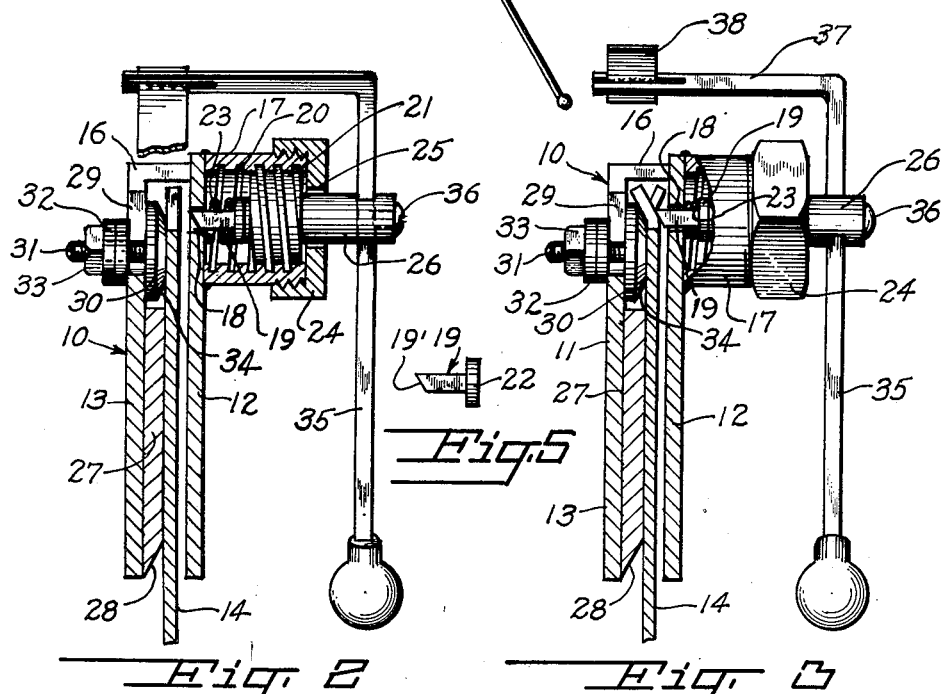
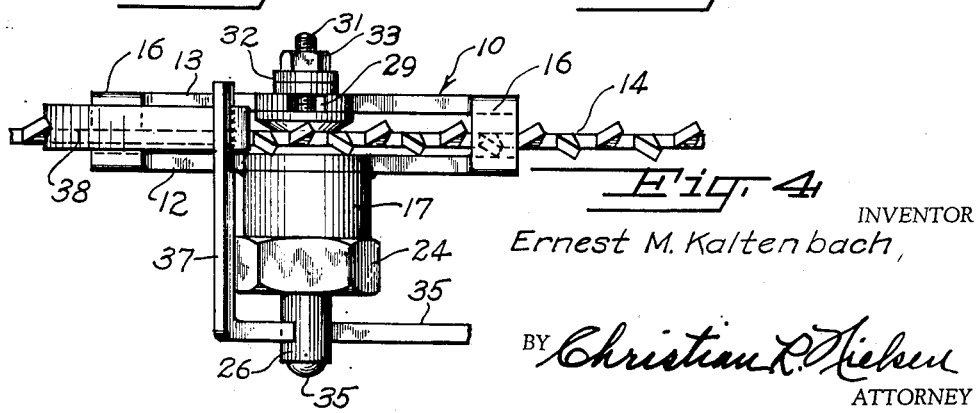
INVENTOR
Ernest M. Kaltenbach,
BY Christian L. Nielsen
                                ATTORNEY Nov. 11, 1952     E. M. KALTENBACH     2,617,318
SAW SET Filed Nov. 19, 1951     2 SHEETS—SHEET 2

INVENTOR
Ernest M. Kaltenbach
BY Christian L. Nielsen
ATTORNEY

Patented Nov. 11, 1952

2,617,318

UNITED STATES PATENT OFFICE 2,617,318

SAW SET

Ernest M. Kaltenbach, Yucaipa, Calif.

Application November 19, 1951, Serial No. 257,053

2 Claims. (Cl. 76—68)

This invention relates to a device for setting the teeth of saws, commonly known as saw sets and it consists in the constructions, arrangements and combinations herein described and claimed.

It is an important object of the invention to provide a device which will set the teeth of hand and circular saws in a quick and efficient manner, insuring the accurate and uniform setting of each tooth.

It is also an object of the invention to provide a saw set in which a tooth will be set by the use of an anvil and a reciprocating plunger, the latter being manually actuated through a lever which also actuates a means for advancing the device along the body of the saw, the space of one tooth, so that the plunger will be in proper alignment with the next tooth to be set.

It is a still further object of the invention to provide a saw set which can be adjusted to saws having different sized teeth.

Additional objects, advantages and features of invention will be apparent from the following description considered in conjunction with accompanying drawings, wherein:

Figure 1 is a side elevation of a hand saw having my saw set applied thereto.

Figure 2 is an enlarged cross section on the line 2—2 of Figure 1, illustrating the inoperative position of the tooth-engaging plunger.

Figure 3 is a similar view illustrating the operative position of the tooth setting plunger.

Figure 4 is a fragmentary plan view of Figure 1.

Figure 5 is a side elevation of the tooth-engaging plunger.

Figure 6:
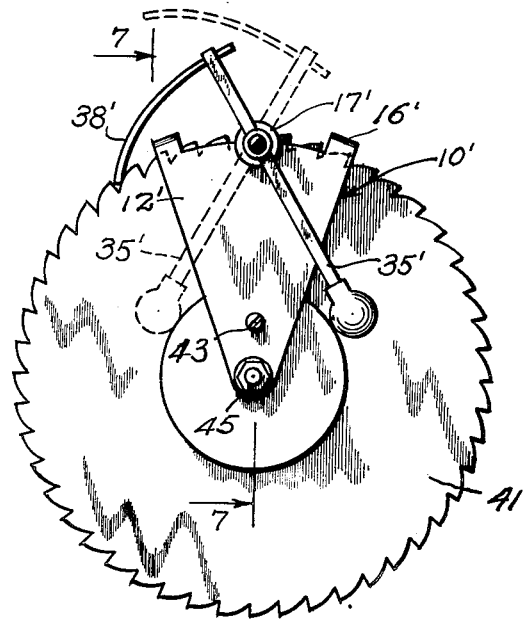
Figure 6 is a side elevation of modified form of the device for use on a circular saw.

Attention is first invited to Figures 1 to 5 of the drawings, wherein there is shown a saw set generally indicated by the reference character 10, comprising a U-shaped body 11 defined by respective parallel walls 12 and 13, spaced apart a suitable distance for accommodation of the saw 14, which is supported by a suitable vise indicated at 15, to maintain the saw in a fixed position.

The walls 12 and 13 are connected rigidly together at their upper edges at the ends by respective plates 16, forming an opening therebetween. The wall 12 is provided upon its outer face with an annular housing 17 adjacent the upper horizontal edge thereof, the wall further having a square opening 18 axially located with respect to the housing and through which a correspondingly shaped tooth-engaging plunger 19 is reciprocably mounted. The housing 17 is interiorly threaded as at 20 to receive a threaded bolt 21, the forward end of which is adapted to engage a head 22 of the plunger 19. A helical spring 23 positioned on the plunger 19 has an end in bearing contact with the wall 12, while the opposite end engages the head 22, the spring thus functioning to retract the plunger as shown in Figure 2. In order to prevent complete withdrawal of the bolt 21 from the housing 17, a nut 24 is engaged upon the exterior of the housing, the nut being provided with a medial opening 25 for passage of a shank 26 of the bolt for rotating the bolt to advance the plunger, as will be described.

The wall 13 is formed with a filler and guide strip 27 upon its inner face, the lower edge being tapered as at 28 to assist the entrance of the saw body. The strip 27 stops short of the upper edge of the wall and opening downwardly from said edge, a slot 29 is formed, being in direct alignment with the housing 17. The slot 29 forms a means for mounting of an anvil 30, as will be described. The strip 27 and the anvil are of a like thickness so that the saw body may lie flush thereagainst, as shown in Figures 2 and 3, the strip further supporting the major portion of the saw body.

The anvil has an axial threaded stud 31 extended through the slot 29 and secured therein by means of lock washers 32 and nut 33. The anvil has a beveled working face 34, and by virtue of the slot 29, the anvil may be adjusted vertically of the slot upon loosening of the nut 33, or the anvil may be rotated to present a new working surface.

In order to rotate the bolt 21 to advance the plunger 19, the shank 26 is formed with an angular transverse opening for reception of an operating lever 35, the lever being secured by a threaded bolt 36 engaged in an opening in the end of the shank 26.

An arm 37 is formed integrally with the lever 35 extended at right angles thereto and positioned over the body 10 as clearly shown in Figures 2, 3 and 4. The end of the arm 37 is slotted to receive one end of a spring finger 38 which is preferably welded therein, the finger having a curvature so as to engage a tooth of the saw for advancing the saw set, as will be described.

In operation of the saw set, with the lever 35 as shown in solid lines in Figure 1, the plunger 19 has been retracted and the spring finger 38 has advanced the saw set the distance of one tooth so that the plunger 19 will be in alignment with the next tooth to be set. By now rotating the lever 35 to the dotted line position of Figure 1, the bolt 21 will be rotated to advance the plunger 19 to present the beveled edge 19' against the tooth and the beveled working surface 34 of the anvil, whereby the tooth will be properly set. Thus a clockwise rotation of the lever 35 will set a tooth, while counter clockwise rotation thereof will retract the plunger 19 by virtue of the spring 23.

It will be understood that by adjusting the lever 35 with respect to the shank 26 a greater or lesser arcuate movement of the spring finger 38 can be obtained, thus adapting the set to use upon saws having large or small teeth.

Figure 7:
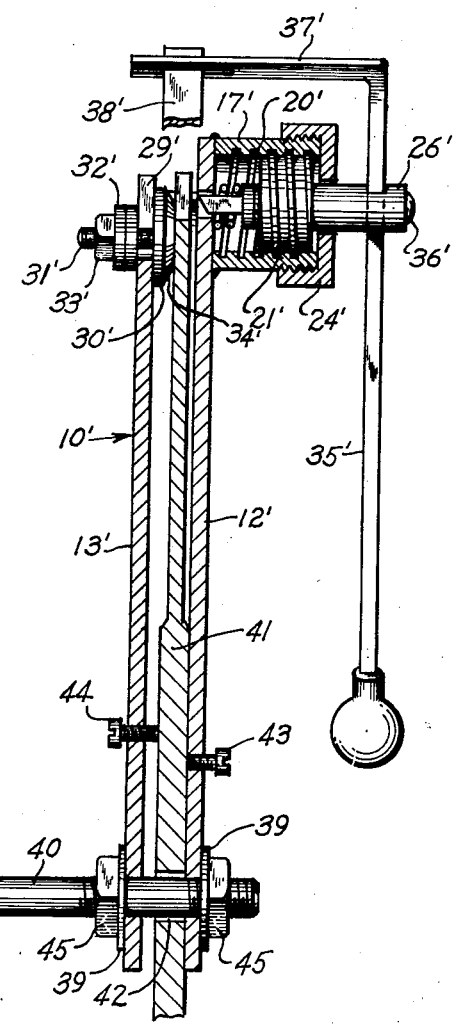
Figure 7 is an enlarged vertical section taken on the line 7—7 of Figure 6.
Figure 8:
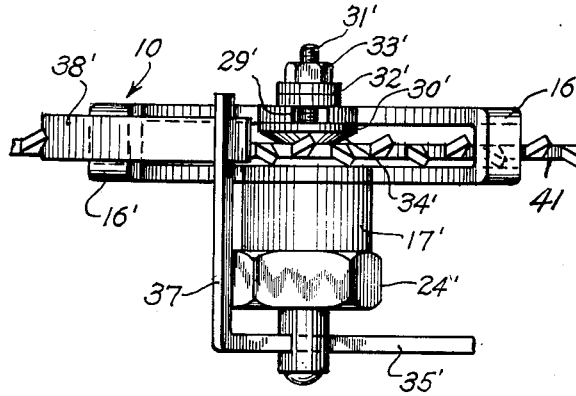
Figure 8 is a fragmentary top plan view of Figure 6.

The modified form shown in Figures 6 to 8 embody certain elements of the first form and these elements are identified by primed reference characters. The form of the saw set here shown is constructed for use on circular saws, the walls 12' and 13' being of segmental shape, the lower ends of which are formed with an aligned opening 39 adapted to receive a shaft 40 therethrough, the shaft likewise rotatably supporting the saw 41 by virtue of its passage through the central opening 42 in the saw. The wall 12' includes a set screw 43 and the wall 13' has a set screw 44 secured therein, the inner ends of the screws contacting respective sides of the saw body, the set screws being employed to adjust the saw with respect to the anvil 30'.

By reason of the nuts 45 upon the shaft 40, the saw set 10' will be held rigid, but the saw is free to rotate upon operation of the lever 35' and spring finger 38'.

Figure 9:
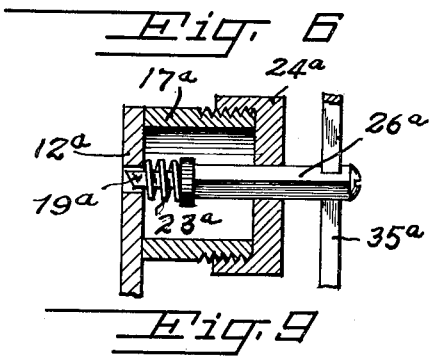
Figure 9 is a fragmentary cross section illustrating a modified form for actuating the tooth-engaging plunger.

In the modified form of the device shown in Figure 9, the wall 12a, the housing 17a and the nut 24a are the same as previously described, except that the interior threads 21—21' of the housing are eliminated, and the axial opening of the collar is of angular formation for reception of a correspondingly shaped shank 26a, which is fixed rigidly in the opening. When the lever 35a is rocked, the nut 24a will be caused to move inwardly upon the threads of the housing and advance the shank 26a to project the plunger 19a. Reverse movement of the lever 35a will allow the spring 23a to retract the plunger.

While I have shown and described preferred forms of the device, this is by way of illustration only, and I consider as my own all such modifications in construction as fairly fall within the scope of the appended claims.

I claim:

1. A saw set comprising a pair of parallel spaced walls connected adjacent upper vertical edges thereof, defining a passage for the reception of the toothed edge of a saw blade, one of said walls having an upwardly opening slot, an anvil having a shank disposed in said slot and including means for securing the shank within the slot and maintaining the anvil upon the inner face of the wall, said anvil having a beveled periphery forming a working face, a filler and guide strip on the inner face of said wall of a thickness corresponding to that of the anvil and of a length to contact the major portion of the saw blade, a housing on the outer face of the other wall, said wall having an angular opening medially of the housing and in registry with a portion of the beveled periphery of the anvil, a tooth engaging plunger reciprocably mounted in said angular opening, spring means for holding said plunger in retracted position, a bolt threadedly engaged in said housing adapted to contact and force said plunger into engagement with a saw tooth positioned in advance of a portion of the beveled periphery of the anvil upon clockwise rotation of the bolt, a lever operatively connected to said bolt having a right angularly disposed arm overlying said wall members, and a spring carried by said arm adapted to engage a tooth of the saw to move the saw set the distance of one tooth upon counterclockwise rotation of said bolt.

2. The structure of claim 1, in which said lever is adjustably connected to said bolt to vary the arcuate movement of the arm and associated spring finger.

ERNEST M. KALTENBACH.

REFERENCES CITED

The following references are of record in the file of this patent:

UNITED STATES PATENTS

| Number | Name | Date |
|---|---|---|
| 340,802 | McEwen | Apr. 27, 1886 |
| 648,405 | Haltom | May 1, 1900 |
| 650,045 | Haltom | May 22, 1900 |
| 1,055,712 | Cowell | Mar. 11, 1913 |
| 1,188,144 | Barker | June 20, 1916 |
| 1,190,972 | Wood | July 11, 1916 |
| 1,448,602 | Smith | Mar. 13, 1923 |
| 1,481,659 | Allen | Jan. 22, 1924 |
| 2,425,876 | Hively | Aug. 19, 1947 |
| 2,494,762 | Jensen et al. | Jan. 17, 1950 |